(12) United States Patent
Ho et al.

(10) Patent No.: US 11,520,189 B2
(45) Date of Patent: Dec. 6, 2022

(54) DISPLAY DEVICE (71) Applicant: AU OPTRONICS CORPORATION, Hsin-Chu (TW)

(72) Inventors: Sheng-Ju Ho, Hsin-Chu (TW); Cheng-Han Tsao, Hsin-Chu (TW); Shang-Jie Wu, Hsin-Chu (TW); Yi-Jung Chen, Hsin-Chu (TW); Hung-Che Lin, Hsin-Chu (TW); Shun-Ling Hou, Hsin-Chu (TW); Nai-Wen Chang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/524,033

(22) Filed: Nov. 11, 2021

(65) Prior Publication Data
US 2022/0066269 A1 Mar. 3, 2022

Related U.S. Application Data (62) Division of application No. 16/455,879, filed on Jun. 28, 2019, now abandoned.

(30) Foreign Application Priority Data

Jun. 29, 2018 (TW) .................. 107122678

(51) Int. Cl.
*G02F 1/1343* (2006.01)
*G02F 1/1335* (2006.01)

(52) U.S. Cl.
CPC .... *G02F 1/134309* (2013.01); *G02F 1/13439* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 2002/0024626 A1* | 2/2002 | Lee | G02F 1/134363 349/143 |
| 2017/0003557 A1* | 1/2017 | Lee | H01L 27/1255 257/E33.053 |
| 2017/0023833 A1* | 1/2017 | No | G02F 1/134309 |

* cited by examiner

*Primary Examiner* — Richard H Kim
(74) *Attorney, Agent, or Firm* — WPAT, PC (57) ABSTRACT A display device includes a plurality of transparent voltage-dividing common electrodes and a plurality of pixel units. The transparent voltage-dividing common electrodes are electrically isolated from each other in a first direction. Each of the pixel units includes a first pixel electrode, a second pixel electrode, and a voltage-dividing switch. The first pixel electrode is configured to receive a data voltage. The second pixel electrode is configured to receive the data voltage. The voltage-dividing switch is configured to divide the data voltage on the second pixel electrode to one of the transparent voltage-dividing common electrodes.

6 Claims, 7 Drawing Sheets

DISPLAY DEVICE

BACKGROUND

Technical Field

The present invention relates to an electronic device, and specifically, to a display device.

Related Art

With the development of science and technology, display devices have been widely used in people's life.

In some practices, a display device includes a pixel electrode, an array side common electrode and a color filter side common electrode. The display device may control a liquid crystal element to perform deflection by using an electrical field that is formed between the pixel electrode and the array side common electrode and an electrical field that is formed between the pixel electrode and the color filter side common electrode.

SUMMARY

One aspect of the present invention relates to a display device. According to an embodiment of the present invention, the display device includes a plurality of transparent voltage-dividing common electrodes and a plurality of pixel units. The transparent voltage-dividing common electrodes are electrically isolated from each other in a first direction. Each of the pixel units includes a first pixel electrode, a first switch, a second pixel electrode, a second switch and a third switch. The first switch is configured to provide a data voltage to the first pixel electrode in response to a scanning signal. The second switch is configured to provide the data voltage to the second pixel electrode in response to the scanning signal. The third switch is electrically coupled between the second pixel electrode and one of the transparent voltage-dividing common electrodes, and the third switch conducts in response to the scanning signal.

Another aspect of the present invention relates to a display device. According to an embodiment of the present invention, the display device includes a plurality of transparent voltage-dividing common electrodes and a plurality of pixel units. The transparent voltage-dividing common electrodes are electrically isolated from each other in a first direction. Each of the pixel units includes a first pixel electrode, a second pixel electrode and a voltage-dividing switch. The first pixel electrode is configured to receive a data voltage. The second pixel electrode is configured to receive the data voltage. The voltage-dividing switch is configured to divide the data voltage on the second pixel electrode to one of the transparent voltage-dividing common electrodes.

Another aspect of the present invention relates to a display device. According to an embodiment of the present invention, the display device includes a plurality of data lines, a plurality of transparent voltage-dividing common electrodes and a plurality of pixel units. The transparent voltage-dividing common electrodes are electrically isolated from each other in a first direction and the transparent voltage-dividing common electrodes at least partially overlap with the data lines. Each of the pixel units includes a first pixel electrode, a second pixel electrode and a voltage-dividing switch. The first pixel electrode is configured to receive a data voltage. The second pixel electrode is configured to receive the data voltage. The voltage-dividing switch is configured to divide the data voltage on the second pixel electrode to one of the transparent voltage-dividing common electrodes.

An aperture ratio of the display device may be improved by applying one of the embodiments mentioned above.

DETAILED DESCRIPTION

The spirit of the present invention will be clearly described with accompanying drawings and detailed descriptions, and any person of ordinary skill in the art may make variations and modifications to the techniques described in the present invention without departing from the spirit and scope of the present invention after understanding embodiments of the present invention.

The terms "First", "second" and the like used herein do not specifically denote any order or sequence and are not intended to limit the present invention, but are only meant to differentiate components or operations described by the same technical terms.

The term "Electrical coupling" used herein may refer to two or more components directly or indirectly making physical or electrical contact with each other, and "electrical coupling" may also refer to two or more components operating or acting with each other.

The terms "Comprise", "include", "have", "contain" and the like used herein are intended to cover a non-exclusive inclusion.

The term "And/or" used in the present invention indicates any combination of listed items as well as any individual item by itself.

Directional terms used in the present invention, such as upper, bottom, left, right, front, or back, which are only directions with reference to the accompanying drawings. Therefore, the directional terms used herein are intended to describe but not to limit the present invention.

The terms such as "substantially", "about" and "roughly" used hereinto describe any quantities that may change slightly or may have errors, but the slight changes or errors will not change the nature of the quantities that are described.

Unless otherwise noted, each of the terms used herein usually have the normal meaning as it has in this technical field, in the disclosed content and in special contents. Some terms that are used in this disclosure will be discussed below or in other places of this specification to provide additional guidance to the person skilled in the art regarding the description of the present invention.

Figure 1:
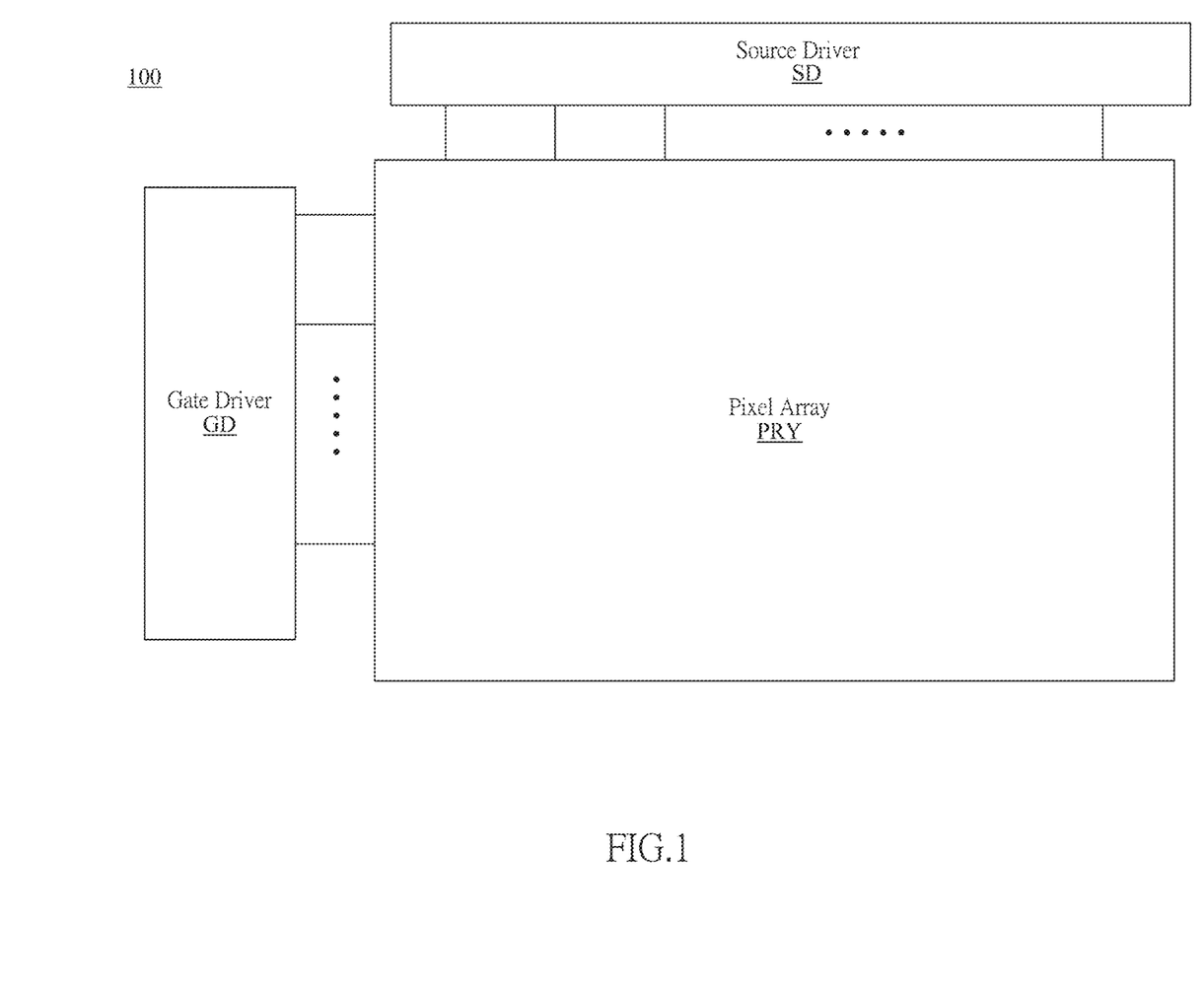
FIG. 1 is a schematic diagram of a display device in accordance with an embodiment of the present invention.

FIG. 1 is a schematic diagram of a display device 100 according to an embodiment of the present invention. In an embodiment, the display device 100 may be a vertical alignment (VA) liquid crystal display device, but is not limited thereto. In an embodiment, the display device 100 may be a multi-domain vertical alignment liquid crystal display device, but is not limited thereto.

In this embodiment, the display device 100 includes a pixel array PRY, a source driver SD and a gate driver GD. The pixel array PRY includes a plurality of sub-pixels arranged in a matrix form (such as red sub-pixels, green sub-pixels and blue sub-pixels) (referred to as pixel units below). In this embodiment, the gate driver GD provides a gate signal to the pixel units row by row, to turn on switches (such as the switch T1 and T2 in FIG. 3) of the pixel units row by row. The source driver SD is configured to receive a gray-scale signal, and provide a data voltage based on the gray-scale signal to the pixel units that are turned on by the switch, so that the pixel units display compliantly with the data voltage.

Figure 2:
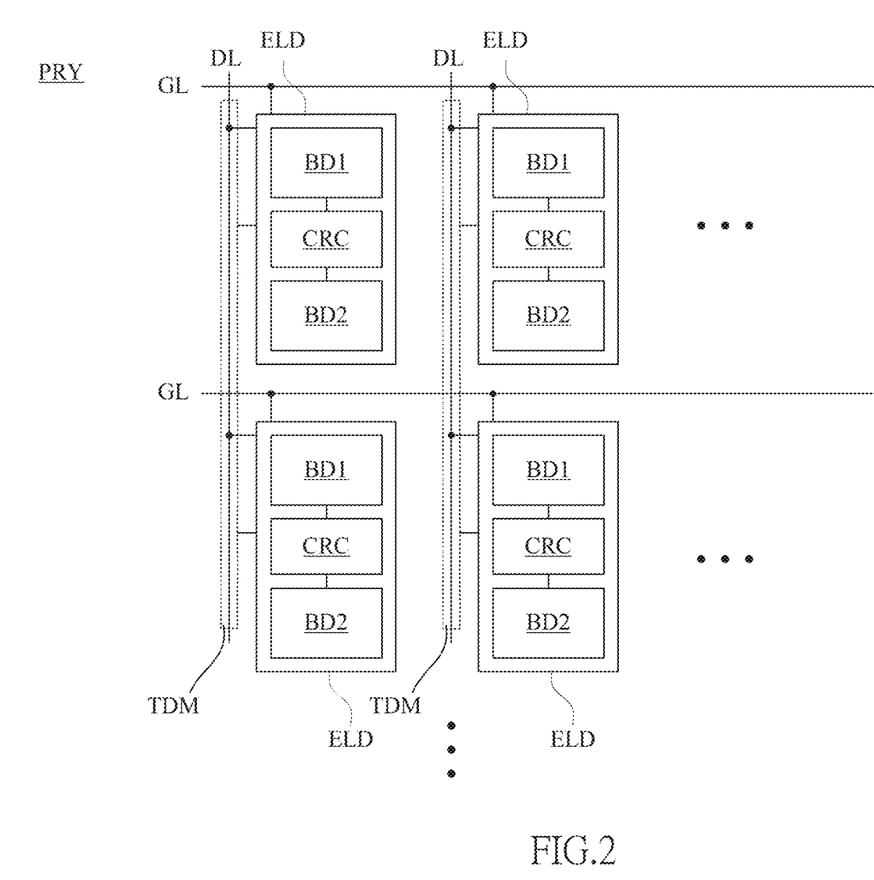
FIG. 2 is a schematic diagram of a pixel array in accordance with an embodiment of the present invention.

Referring to FIG. 2, in an embodiment, the pixel array PRY includes a plurality of pixel units ELD. In an embodiment, the pixel unit ELD may include a driving circuit CRC, a first pixel electrode BD1 (such as a primary pixel electrode) and a second pixel electrode BD2 (such as a secondary pixel electrode). In an embodiment, the driving circuit CRC receives a gate signal from a gate line GL and the data voltage from a data line DL, and provides the data voltage based on the gate signal to the first pixel electrode BD1 and the second pixel electrode BD2.

In an embodiment, the pixel array PRY further includes a plurality of transparent voltage-dividing common electrodes TDM. In an embodiment, the transparent voltage-dividing common electrodes TDM may be electrically connected to the second pixel electrode BD2. In an embodiment, the transparent voltage-dividing common electrodes TDM may be configured to divide a voltage on the second pixel electrode BD2, making the voltage on the first pixel electrode BD1 slightly different from the voltage on the second pixel electrode BD2 while the first pixel electrode BD1 and the second pixel electrode BD2 receive the same data voltage, and thereby alleviating color washout phenomena of the display device 100.

In an embodiment, the transparent voltage-dividing common electrodes TDM may partially overlap with the data line DL, to mask the data line DL and reduce an electromagnetic interference on the data line DL. In an embodiment, the transparent voltage-dividing common electrodes TDM substantially do not overlap with the first pixel electrode BD1 and the second pixel electrode BD2. In an embodiment, the transparent voltage-dividing common electrodes TDM may be implemented with a metal oxide, such as an indium tin oxide (ITO). However other transparent conductive materials are also in the scope of the present invention.

In some practices, a metal layer in the display device may be used to form a metal mesh to divide the voltage on the second pixel electrode. However, because the metal mesh is disposed in a luminous zone of the pixel array, an aperture ratio of the display device will be affected.

Relatively, in some embodiments of the present invention, the transparent voltage-dividing common electrodes TDM are used to divide the voltage on the second pixel electrode BD2, to avoid a use of the metal layer. Further, in some embodiments of the present invention, because the transparent voltage-dividing common electrodes TDM substantially do not overlap with the first pixel electrode BD1 and the second pixel electrode BD2, the aperture ratio of the display device will not be affected.

Figure 3:
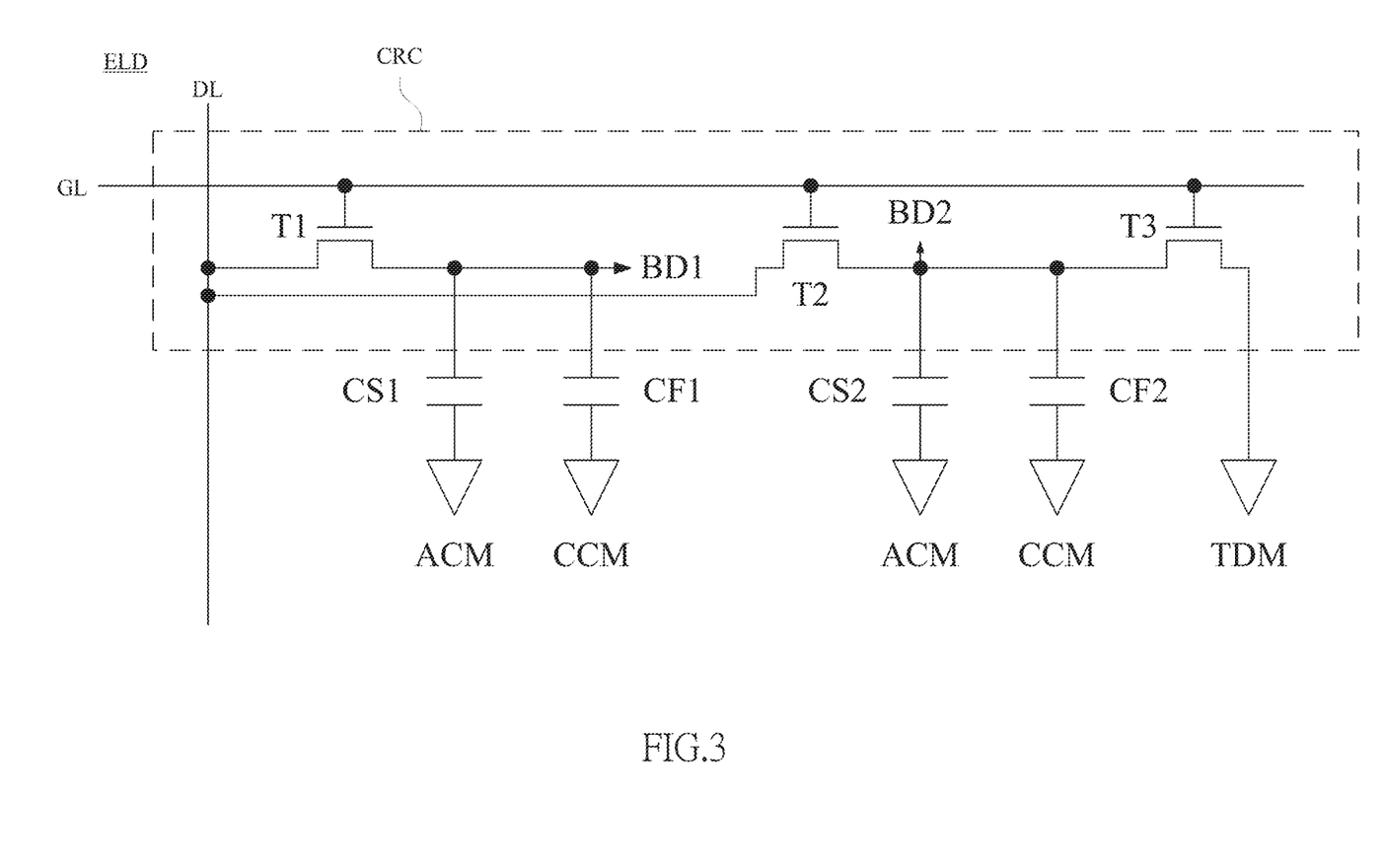
FIG. 3 is a diagram of an equivalent circuit of a pixel unit in accordance with an embodiment of the present invention.

Refer to FIG. 3. FIG. 3 is a diagram of an equivalent circuit of a pixel unit ELD according to an embodiment of the present invention. In this embodiment, the driving circuit CRC includes switches T1, T2 and T3.

In an embodiment, the switch T1 is electrically coupled between the data line DL and the first pixel electrode BD1, to provide the data voltage from the data line DL to the first pixel electrode BD1. In an embodiment, the switch T2 is electrically coupled between the data line DL and the second pixel electrode BD2, to provide the data voltage from the data line DL to the second pixel electrode BD2. In an embodiment, the switch T3 is electrically coupled between the second pixel electrode BD2 and the transparent voltage-dividing common electrode TDM to divide the data voltage on the second pixel electrode BD2, which is from the data line DL, to the transparent voltage-dividing common electrode TDM. In an embodiment, the switches T1, T2 and T3 are turned on and off based on the same gate signal from the same gate line GL. That is, the switches T1, T2 and T3 are turned on and off substantially at the same time.

In an embodiment, a capacitance CS1 is formed between the first pixel electrode BD1 and an array side common electrode ACM. In an embodiment, a capacitance CF1 is formed between the first pixel electrode BD1 and a color filter side common electrode CCM. In an embodiment, a capacitance CS2 is formed between the second pixel electrode BD2 and the array side common electrode ACM. In an embodiment, a capacitance CF2 is formed between the second pixel electrode BD2 and the color filter side common electrode CCM.

Utilizing the electrical field that is formed between the first pixel electrode BD1, the array side common electrode ACM, and the color filter side common electrode CCM and the electrical field that is formed between the second pixel electrode BD2, the array side common electrode ACM, and the color filter side common electrode CCM, a liquid crystal element corresponding to the pixel unit ELD may be controlled to deflect, thereby achieving a display effect.

Figure 4:
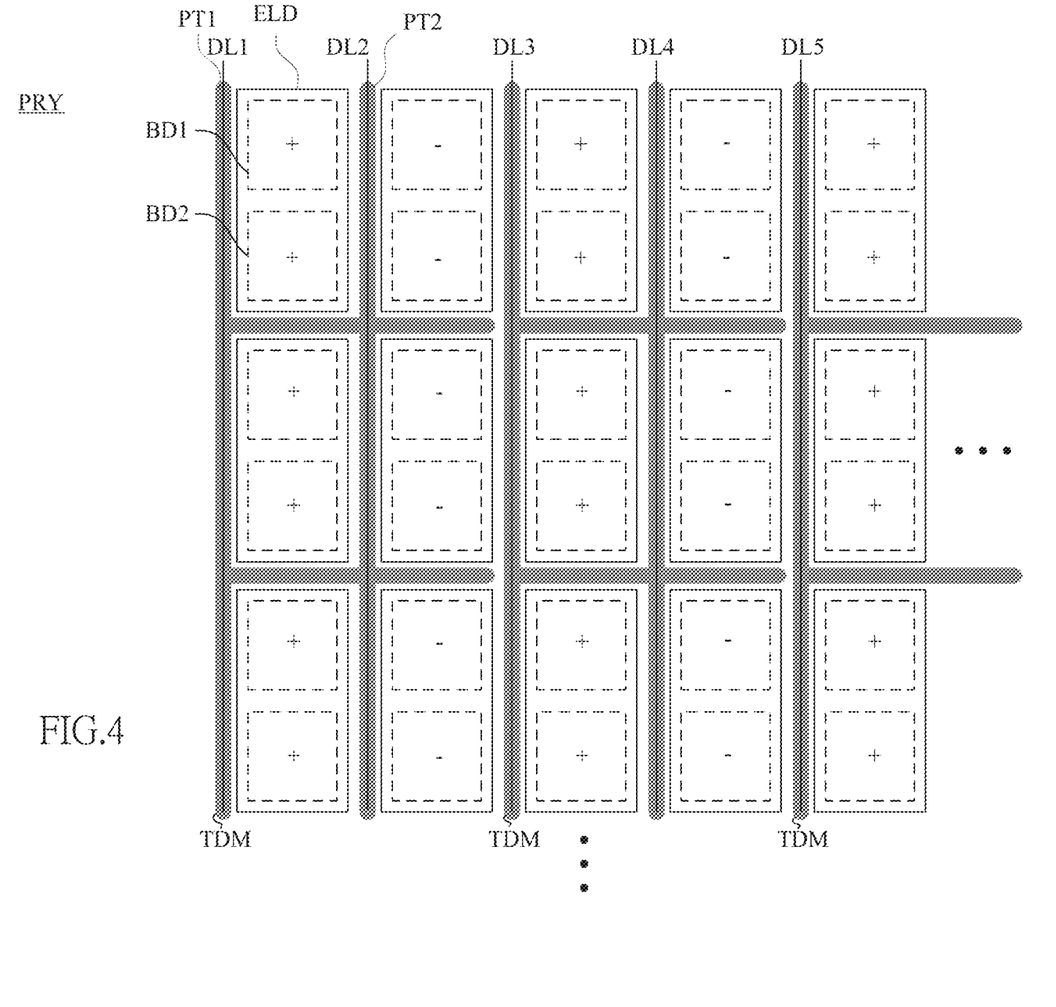
FIG. 4 is a setup diagram of transparent voltage-dividing common electrodes in accordance with an embodiment of the present invention.

FIG. 4 is a setup diagram of transparent voltage-dividing common electrodes TDM according to an embodiment of the present invention. In this embodiment, the pixel units ELD are respectively configured to receive data voltages of different polarities.

It should be noted that the data voltages of different polarities herein refer to the voltages having values higher or lower than the voltage level of the array side common electrode ACM, and provided alternately by the display device 100 in order to reverse polarity. For example, if the voltage level of the array side common electrode ACM is 0 V, the data voltage, in the state of the positive polarity, may range between 0V to +5V and correspond to a gray-scale value between 0 to 255; while in the state of the negative polarity, the data voltage may range from 0V to −5V and correspond to a gray-scale value between 0 to 255. It should be noted that the voltage level herein is merely an example, and the present invention is not limited thereto.

In FIG. 4, a symbol "+" indicates a pixel unit ELD receiving data voltage of positive polarity, and a symbol "−" indicates a pixel unit ELD receiving data voltage of negative polarity. In this embodiment, the pixel units ELD in the same column receive data voltage of the same polarity. In this embodiment, one column of the pixel units ELD that receive the data voltage of the positive polarity is adjacent to two columns of the pixel units ELD that receive the data voltage of the negative polarity. One column of the pixel units ELD that receive the data voltage of the negative polarity is adjacent to two columns of the pixel units ELD that receive the data voltage of the positive polarity.

In this embodiment, the data lines DL1, DL3 and DL5 are configured to, for example, provide data voltage of the positive polarity to the corresponding pixel units ELD, and the data lines DL2 and DL4 are configured to, for example, provide data voltage of the negative polarity to the corresponding pixel units ELD.

In this embodiment, the plurality of transparent voltage-dividing common electrodes TDM is arranged in a mesh pattern. In this embodiment, the transparent voltage-dividing common electrodes TDM are arranged between the pixel units ELD. In an embodiment, the transparent voltage-dividing common electrodes TDM are electrically isolated from each other in a first direction, wherein the first direction is a direction in which, for example, the gate line GL (refer to FIG. 2) extends.

By such arrangement, the transparent voltage-dividing common electrodes TDM will not be affected by the array side common electrode ACM, thereby preventing horizontal crosstalk.

In an embodiment, one transparent voltage-dividing common electrode TDM may overlap with the first data line and the second data line at the same time, wherein the first data line and the second data line are configured to provide data voltages of different polarities in a same frame. For example, the first data line may be data line DL1, DL3 and DL5, and the second data line may be data line DL2 and DL4. A first part PT1 of one of the transparent voltage-dividing common electrodes TDM may overlap with the data line DL1 that transfers data voltage of the positive polarity in a specific frame, and a second part PT2 of the one of the transparent voltage-dividing common electrodes TDM may overlap with data line DL2 that transfers data voltage of the negative polarity in the specific frame.

In an embodiment, the quantity of first data lines that overlap with the one of the transparent voltage-dividing common electrodes TDM is substantially the same as the quantity of second data lines that overlap with the one of the transparent voltage-dividing common electrodes TDM. For example, the quantity of data lines (such as data line DL1) which are configured to provide data voltage of the positive polarity and overlap with the one of the transparent voltage-dividing common electrodes TDM is the same as the quantity of data lines (such as data line DL2) which are configured to provide data voltage of the negative polarity and overlap with the one of the transparent voltage-dividing common electrodes TDM. In other aspects, in an embodiment, the overlapped area of the one of the transparent voltage-dividing common electrodes TDM and the first data lines is substantially the same as the overlapped area of the one of the transparent voltage-dividing common electrodes TDM and the second data lines when the width of the data lines DL1 and the width of the data lines DL2 are substantially the same.

By the above arrangement, vertical crosstalk caused by first data lines and vertical crosstalk caused by second data lines on the transparent voltage-dividing common electrodes TDM may cancel each other out.

It should be noted that although the above embodiment takes one transparent voltage-dividing common electrode TDM that overlaps with one first data line and one second data line as an example, the quantity of first data lines and second data lines may vary depending on actual needs. For example, one transparent voltage-dividing common electrode TDM may overlap with two or three first data lines and second data lines. Therefore, the present invention is not limited by the above embodiments.

Figure 5:
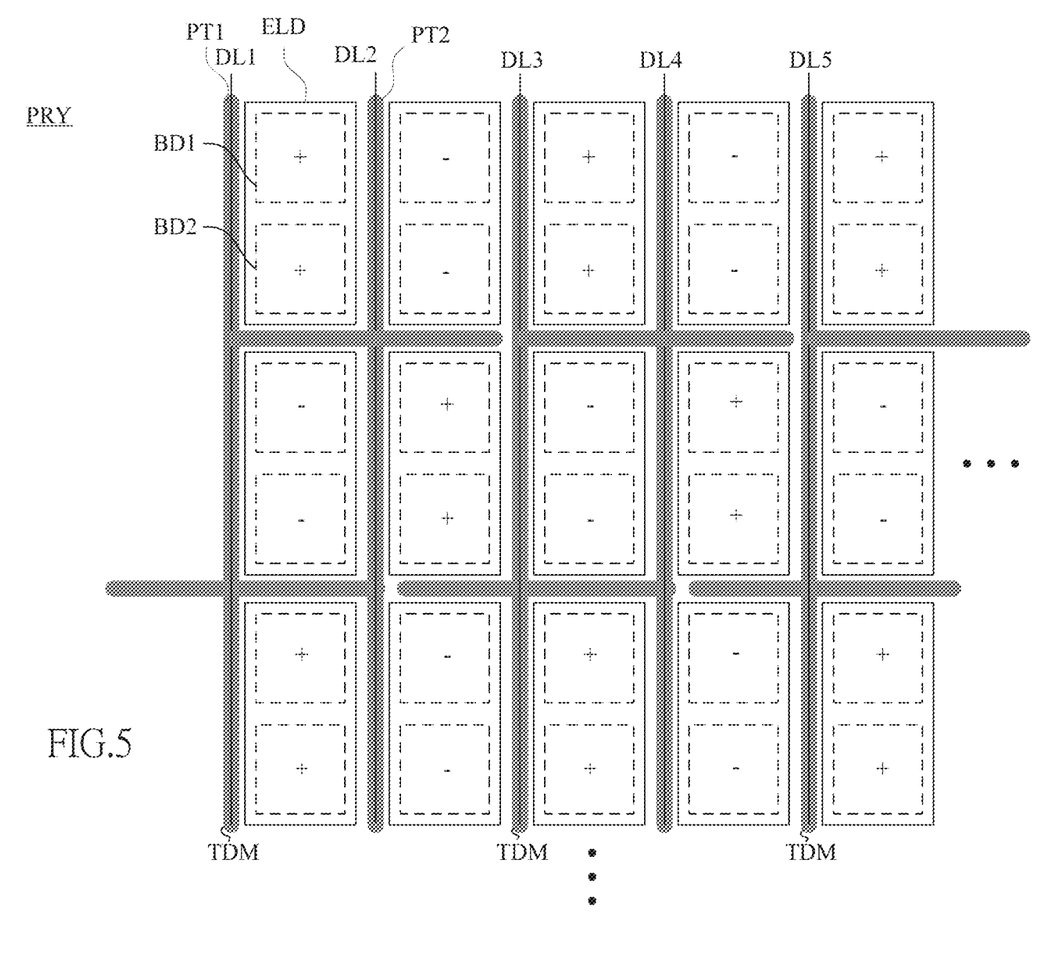
FIG. 5 is a setup diagram of transparent voltage-dividing common electrodes in accordance with another embodiment of the present invention.

FIG. 5 is a setup diagram of transparent voltage-dividing common electrodes TDM in accordance with another embodiment of the present invention. In this embodiment, the arrangement of the transparent voltage-dividing common electrodes TDM is roughly the same as that in the embodiments corresponding to FIG. 4. Therefore, the similar part is not described again herein.

In this embodiment, the pixel units ELD that are configured to receive data voltage of the positive polarity and the pixel units ELD that are configured to receive data voltage of the negative polarity are dot-interlaced. That is, for a pixel units ELD that is configured to receive data voltage of the positive polarity, neighboring pixel units ELD are configured to receive data voltage of the negative polarity. Similarly, for a pixel unit ELD that is configured to receive data voltage of the negative polarity, neighboring pixel units ELD are configured to receive data voltage of the negative polarity.

Similar to the embodiments corresponding to FIG. 4, in this embodiment, the data lines DL1, DL3 and DL5 are configured to, for example, provide data voltage of the positive polarity to the corresponding pixel units ELD, and the data lines DL2 and DL4 are configured to, for example, provide data voltage of the negative polarity to the corresponding pixel units ELD. In this embodiment, the plurality of transparent voltage-dividing common electrodes TDM is arranged in a mesh pattern. In this embodiment, the transparent voltage-dividing common electrodes TDM are electronically isolated from each other in the first direction.

By such arrangement, the transparent voltage-dividing common electrodes TDM will not be affected by the array side common electrode ACM, thereby preventing horizontal crosstalk.

Further, in an embodiment, similar to the embodiments corresponding to FIG. 4, the quantity of the first data lines that overlap with one transparent voltage-dividing common electrode TDM is roughly the same as the quantity of the second data lines that overlap with the one transparent voltage-dividing common electrode TDM. In other aspects, in an embodiment, the overlapped area of one transparent voltage-dividing common electrode TDM and the first data lines is roughly the same as the overlapped area of the one transparent voltage-dividing common electrode TDM and the second data lines when the width of the first data lines and the width of the second data lines are roughly the same.

By the above arrangement, the vertical crosstalk on the transparent voltage-dividing common electrode TDM caused by the first data lines may be canceled out by that caused by the second data lines.

Similarly, in the embodiments corresponding to FIG. 5, although descriptions are given with an example in which one transparent voltage-dividing common electrode TDM overlaps with one first data line and one second data line, the quantity of the first data lines and the second data lines may vary depending on actual needs. For example, one transparent voltage-dividing common electrode TDM may overlap with two or three first data lines and second data lines. Therefore, the present invention is not limited by the above embodiments.

Figure 6:
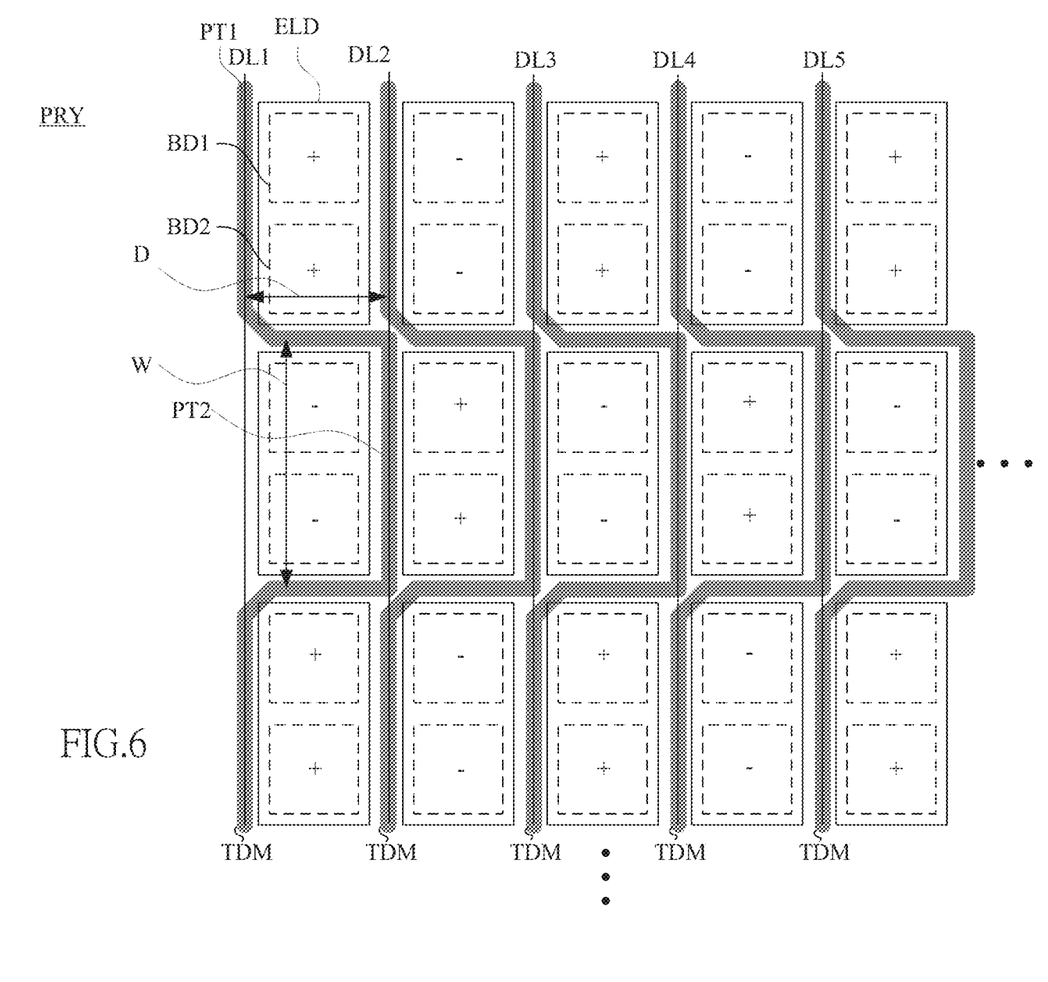
FIG. 6 is a setup diagram of transparent voltage-dividing common electrodes in accordance with another embodiment of the present invention.

FIG. 6 is a setup diagram of transparent voltage-dividing common electrodes TDM according to another embodiment of the present invention. In this embodiment, the arrangement of the transparent voltage-dividing common electrodes TDM is roughly the same as that in the embodiments corresponding to FIG. 5. Therefore, the similar part is not described again herein.

Similar to the embodiments corresponding to FIG. 4, in this embodiment, pixel units ELD that are configured to receive the data voltage of the positive polarity and pixel units ELD that are configured to receive the data voltage of the negative polarity are dot-interlaced. In this embodiment, the data lines DL1, DL3 and DL5 are configured to, for example, provide data voltage of the positive polarity to the corresponding pixel units ELD, and the data lines DL2 and DL4 are configured to, for example, provide data voltage of the negative polarity to the corresponding pixel units ELD.

In this embodiment, the plurality of transparent voltage-dividing common electrodes TDM is disposed in a square wave pattern. In an embodiment, wave height D of the transparent voltage-dividing common electrode TDM in the first direction correspond to a length of one of the pixel units ELD in the first direction, wherein the first direction is, for example, the direction in which the gate line GL extends. In an embodiment, wave width W of the transparent voltage-dividing common electrode TDM in a second direction corresponds to a length of one of the pixel units ELD in the second direction, wherein the second direction is, for example, the direction in which the data line DL extends.

In this embodiment, the transparent voltage-dividing common electrodes TDM are electronically isolated from each other in the first direction.

By such arrangement, the transparent voltage-dividing common electrodes TDM will not be affected by an array side common electrode ACM, thereby preventing horizontal crosstalk.

In this embodiment, one transparent voltage-dividing common electrode TDM may overlap with the first data line and the second data line at the same time. For example, a first part PT1 of one transparent voltage-dividing common electrode TDM may overlap with the data line DL1 that transfers data voltage of the positive polarity in a specific frame, and a second part PT2 of the transparent voltage-dividing common electrode TDM may overlap with the data line DL2 that transfers data voltage of the negative polarity in the specific frame.

In an embodiment, the quantity of first data lines that overlap with one transparent voltage-dividing common electrode TDM is the same as the quantity of second data lines that overlap with the one transparent voltage-dividing common electrode TDM. For example, the quantity of data lines (such as data line DL1) which are configured to provide data voltage of the positive polarity and overlap with one transparent voltage-dividing common electrode TDM is the same as the quantity of data lines (such as data lines DL2) which are configured to provide the data voltage of the negative polarity and overlap with the one transparent voltage-dividing common electrode TDM.

By the above arrangement, vertical crosstalk on the transparent voltage-dividing common electrodes TDM caused by the first data line may be canceled out by that caused by the second data line.

Figure 7:
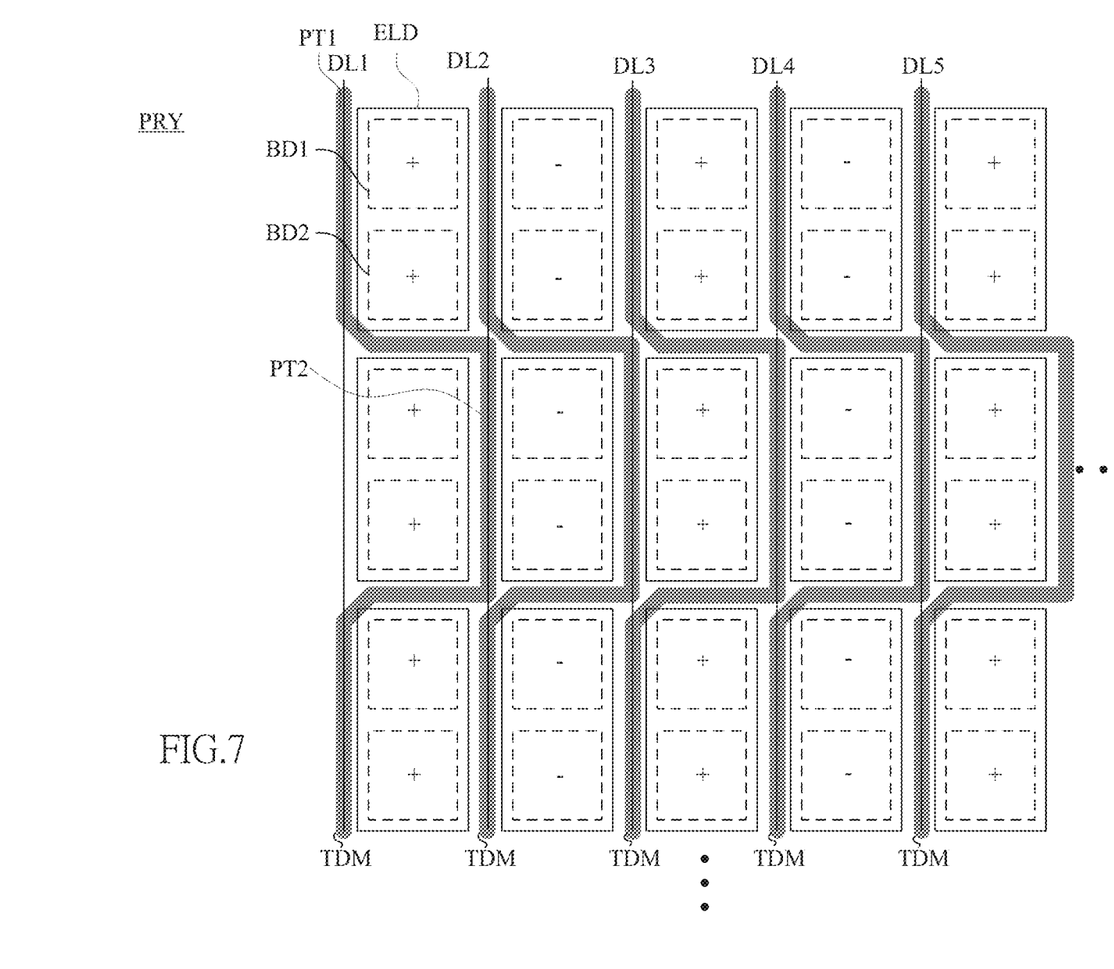
FIG. 7 is a setup diagram of transparent voltage-dividing common electrodes in accordance with another embodiment of the present invention.

FIG. 7 is a setup diagram of transparent voltage-dividing common electrodes TDM in accordance with another embodiment of the present invention. In this embodiment, the arrangement of the transparent voltage-dividing common electrodes TDM is roughly the same as that in the embodiments corresponding to FIG. 6. Therefore, the similar part is not described again herein.

In this embodiment, the pixel units ELD that are configured to receive data voltage of the positive polarity and the pixel units ELD that are configured to receive data voltage of the negative polarity are not dot-interlaced. That is, the pixel units ELD in the same column receive data voltage of the same polarity. In this embodiment, the transparent voltage-dividing common electrode TDM may be arranged in the square wave pattern similar to the one seen in embodiments corresponding to FIG. 6. Therefore, details are not described again herein.

By such arrangement, the transparent voltage-dividing common electrodes TDM will also not be affected by the array side common electrode ACM, thereby preventing horizontal crosstalk. And vertical crosstalk on the transparent voltage-dividing common electrode TDM caused by the first data line may be canceled out by that caused by the second data line.

Although the present invention is disclosed with reference to the above embodiments, the embodiments are not intended to limit the present invention. Any person of ordinary skill in the art may make variations and modifications without departing from the spirit and scope of the present invention. Therefore, the protection scope of the present invention should be subject to the appended claims.

LIST OF REFERENCE NUMERALS

100: Display device
GD: Gate driver
PRY: Pixel array
SD: Source driver
ELD: Pixel unit
BD1: Pixel electrode
BD2: Pixel electrode
CRC: Driving circuit
TDM: Transparent voltage-dividing common electrode
T1-T3: Switch
CS1-CS2: Capacitance
CF1-CF2: Capacitance
ACM: Array side common electrode
CCM: Color filter side common electrode
PT1: First part of the transparent voltage-dividing common electrode
PT2: Second part of the transparent voltage-dividing common electrode
DL1-DL5: Color filter side common electrode
D: Wave height
W: Wave width

What is claimed is:
1. A display device, comprising:
a plurality of transparent voltage-dividing common electrodes, wherein the transparent voltage-dividing common electrodes are electrically isolated from each other in a first direction; and
a plurality of pixel units, wherein each of the pixel units comprises:
a first pixel electrode;
a first switch, configured to provide a data voltage to the first pixel electrode in response to a scanning signal;
a second pixel electrode;
a second switch, configured to provide the data voltage to the second pixel electrode in response to the scanning signal;
a third switch, electrically coupled between the second pixel electrode and one of the transparent voltage-dividing common electrodes, wherein the third switch conducts in response to the scanning signal;

wherein the transparent voltage-dividing common electrodes are disposed in a square wave pattern, and a wave width of the transparent voltage-dividing common electrodes in a second direction corresponds to a length of one of the pixel units in the second direction.

2. The display device according to claim 1, wherein a wave height of the transparent voltage-dividing common electrodes in the first direction corresponds to a width of one of the pixel units in the first direction.

3. A display device, comprising:
   a plurality of transparent voltage-dividing common electrodes, wherein the transparent voltage-dividing common electrodes are electrically isolated from each other in a first direction; and
   a plurality of pixel units, wherein each of the pixel units comprises:
      a first pixel electrode, configured to receive a data voltage;
      a second pixel electrode, configured to receive the data voltage; and
      a voltage-dividing switch, configured to divide the data voltage on the second pixel electrode to one of the transparent voltage-dividing common electrodes;
   wherein the transparent voltage-dividing common electrodes are disposed in a square wave pattern, and a wave width of the transparent voltage-dividing common electrodes in a second direction corresponds to a length of one of the pixel units in the second direction.

4. The display device of claim 3, wherein a wave height of the transparent voltage-dividing common electrodes in the first direction corresponds to a width of one of the pixel units in the first direction.

5. A display device, comprising:
   a plurality of data lines;
   a plurality of transparent voltage-dividing common electrodes, wherein the transparent voltage-dividing common electrodes are electrically isolated from each other in a first direction, and the transparent voltage-dividing common electrodes at least partially overlap with the data lines; and
   a plurality of pixel units, wherein each of the pixel units comprises:
      a first pixel electrode, configured to receive a data voltage of one of the data lines;
      a second pixel electrode, configured to receive the data voltage of the one of the data lines; and
      a voltage-dividing switch, configured to divide the data voltage on the second pixel electrode to one of the transparent voltage-dividing common electrodes;
   wherein the transparent voltage-dividing common electrodes are disposed in a square wave pattern, and a wave width of the transparent voltage-dividing common electrodes in a second direction corresponds to a length of one of the pixel units in the second direction.

6. The display device of claim 5, wherein a wave height of the transparent voltage-dividing common electrodes in the first direction corresponds to a width of one of the pixel units in the first direction.

* * * * *